US009194987B2

(12) United States Patent
Wei

(10) Patent No.: US 9,194,987 B2
(45) Date of Patent: Nov. 24, 2015

(54) OPTICAL ELEMENT FILTERING ULTRAVIOLET LIGHT AND LENS MODULE INCLUDING SAME

(71) Applicant: Chao-Tsang Wei, New Taipei (TW)

(72) Inventor: Chao-Tsang Wei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 480 days.

(21) Appl. No.: 13/655,684

(22) Filed: Oct. 19, 2012

(65) Prior Publication Data

US 2013/0293950 A1     Nov. 7, 2013

(30) Foreign Application Priority Data

May 2, 2012   (TW) .............................. 101115586 A

(51) Int. Cl.
*G02B 5/20* (2006.01)
*G02B 1/115* (2015.01)
*G02B 5/28* (2006.01)

(52) U.S. Cl.
CPC ................ *G02B 5/208* (2013.01); *G02B 1/115* (2013.01); *G02B 5/283* (2013.01)

(58) Field of Classification Search
CPC ................ G02B 5/28–5/289; G02B 1/10–1/18
USPC .......... 359/350, 577–590, 351–358, 359–361
See application file for complete search history.

(56) References Cited

U.S. PATENT DOCUMENTS

| | | |
|---|---|---|
| 2004/0207920 A1* | 10/2004 | Kitagawa ...................... 359/582 |
| 2005/0018302 A1* | 1/2005 | Yano et al. ................... 359/588 |
| 2005/0179995 A1* | 8/2005 | Nikolov et al. ............... 359/359 |
| 2007/0229945 A1* | 10/2007 | Shibuya ........................ 359/359 |
| 2007/0285555 A1* | 12/2007 | Chen ............................. 348/340 |
| 2008/0013178 A1* | 1/2008 | Terada .......................... 359/586 |
| 2010/0226004 A1* | 9/2010 | Nishimoto et al. ........... 359/359 |
| 2011/0096391 A1* | 4/2011 | Kanai et al. .................. 359/360 |
| 2011/0310472 A1* | 12/2011 | Hirai et al. .................... 359/359 |

* cited by examiner

*Primary Examiner* — Derek S Chapel
*Assistant Examiner* — Jeffrey Madonna
(74) *Attorney, Agent, or Firm* — Novak Druce Connolly Bove + Quigg LLP

(57) ABSTRACT

An optical element includes a substrate and a film. The substrate made of sapphire. The film is covered on the substrate and is configured for increasing reflectivity of ultraviolet lights and filtering the ultraviolet lights. The film includes a plurality of high refractive index layers and a plurality of low refractive index layers alternately stacked on the substrate.

4 Claims, 3 Drawing Sheets

OPTICAL ELEMENT FILTERING ULTRAVIOLET LIGHT AND LENS MODULE INCLUDING SAME

BACKGROUND

1. Technical Field

The present disclosure relates to optical elements, and particularly, to an optical element for filtering ultraviolet light and a lens module including the optical element.

2. Description of Related Art

Sapphires have excellent hardness and wear-resistance, and are used in optics and machinery. The sapphire can be used as a cover glass to protect lenses received in a lens module. However, quality of images captured by the lens module may be affected by ultraviolet light as the sapphire transmits ultraviolet light.

Therefore, it is desirable to provide an optical element and a lens module, which can overcome the limitations described.

DETAILED DESCRIPTION

Embodiments of the disclosure will be described with reference to the drawings.

Figure 1:
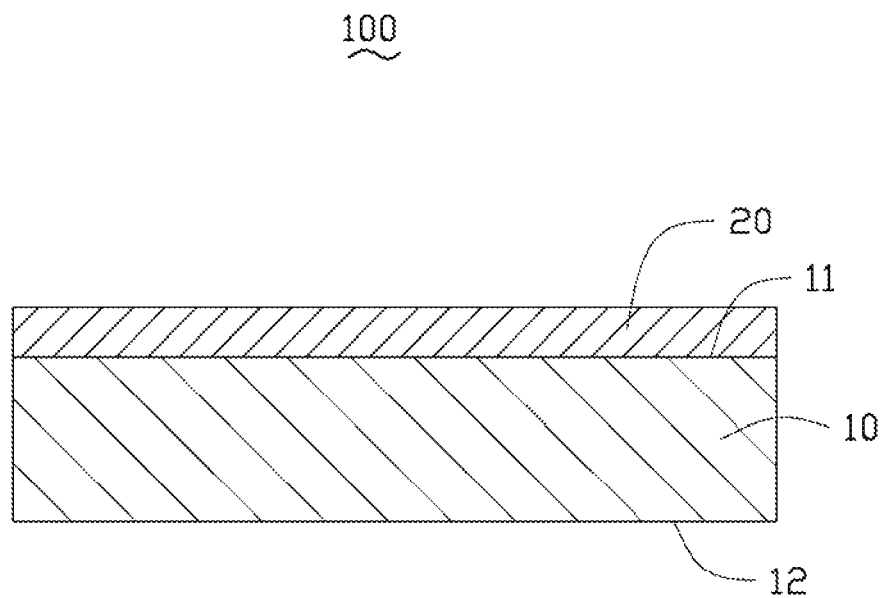
FIG. 1 is a cross-sectional schematic view of an optical element in accordance with an exemplary embodiment.

Referring to FIG. 1, an optical element 100, according to an exemplary embodiment, is configured to filter out (i.e., reject) ultraviolet light and transmit (i.e., pass) visible light. The optical element 100 includes a substrate 10 and a film 20 formed on the substrate 10.

The substrate 10 is plated shaped and is made of sapphire. Sapphire is a gemstone variety of the mineral corundum, and has a hexagonal crystal structure. The main chemical component of sapphire is aluminum oxide, and the refractive index of the sapphire is from about 1.762 to about 1.770. A reflectivity of the substrate 10 at ultraviolet wavelengths from about 190 nm to about 400 nm is lower than 10%. A transmissivity of the substrate 10 at ultraviolet wavelengths from about 190 nm to about 400 nm is greater than 70%. The substrate 10 includes a first surface 11 and a second surface 12 opposite to the first surface 11.

The film 20 is configured to increase the reflectivity of the substrate 10 at the ultraviolet lights, and is coated on the substrate 10 by a sputter method or an evaporation method. The film 20 includes a number of high refractive index layers and a number of low refractive index layers alternately stacked on the substrate 10. A material of the high refractive index layers can be a titanium dioxide ($TiO_2$), and the refractive index of $TiO_2$ is from about 2.55 to about 2.76. A material of the low refractive index layers can be a magnesium fluoride ($MgF_2$), and the refractive index of $MgF_2$ is about 1.38.

The film 20 is stacked by a first layer to a forty-fourth layer in an order facing away from the first surface 11. The high refractive index layer is the odd number layer, and the low refractive index layers are the even number layer. The thicknesses all the layers are about 14 nm, 38 nm, 17 nm, 16 nm, 20 nm, 41 nm, 21 nm, 37 nm, 17 nm, 39 nm, 25 nm, 45 nm, 19 nm, 35 nm, 19 nm, 34 nm, 10 nm, 20 nm, 19 nm, 31 nm, 15 nm, 32 nm, 35 nm, 42 nm, 28 nm, 43 nm, 15 nm, 28 nm, 35 nm, 44 nm, 27 nm, 74 nm, 29 nm, 57 nm, 26 nm, 69 nm, 36 nm, 35 nm, 43 nm, 39 nm, 39 nm, 30 nm, 22 nm, 84 nm, respectively. The error of the thickness of each layer is ±3 nm.

In the embodiment, the film 20 is coated on the first surface 11 of the substrate 10. The material and thickness of each layer of the film 20 are shown in Table 1.

TABLE 1

| Layers | Material | Thickness (nm) |
|---|---|---|
| First layer | $TiO_2$ | 14.38 |
| Second layer | $MgF_2$ | 38.23 |
| Third layer | $TiO_2$ | 17.90 |
| Fourth layer | $MgF_2$ | 16.95 |
| Fifth layer | $TiO_2$ | 20.42 |
| Sixth layer | $MgF_2$ | 41.50 |
| Seventh layer | $TiO_2$ | 21.57 |
| Eighth layer | $MgF_2$ | 37.05 |
| Ninth layer | $TiO_2$ | 17.21 |
| Tenth layer | $MgF_2$ | 39.16 |
| Eleventh layer | $TiO_2$ | 25.80 |
| Twelfth layer | $MgF_2$ | 45.09 |
| Thirteenth layer | $TiO_2$ | 19.88 |
| Fourteenth layer | $MgF_2$ | 35.69 |
| Fifteenth layer | $TiO_2$ | 19.08 |
| Sixteenth layer | $MgF_2$ | 34.74 |
| Seventeenth layer | $TiO_2$ | 10.52 |
| Eighteenth layer | $MgF_2$ | 20.29 |
| Nineteenth layer | $TiO_2$ | 16.96 |
| Twentieth layer | $MgF_2$ | 31.03 |
| Twenty first layer | $TiO_2$ | 15.81 |
| Twenty second layer | $MgF_2$ | 32.09 |
| Twenty third layer | $TiO_2$ | 35.00 |
| Twenty fourth layer | $MgF_2$ | 42.54 |
| Twenty fifth layer | $TiO_2$ | 28.04 |
| Twenty sixth layer | $MgF_2$ | 43.07 |
| Twenty seventh layer | $TiO_2$ | 15.48 |
| Twenty eighth layer | $MgF_2$ | 28.10 |
| Twenty ninth layer | $TiO_2$ | 35.74 |
| Thirtieth layer | $MgF_2$ | 44.35 |
| Thirty first layer | $TiO_2$ | 27.38 |
| Thirty second layer | $MgF_2$ | 74.79 |
| Thirty third layer | $TiO_2$ | 29.85 |
| Thirty fourth layer | $MgF_2$ | 57.39 |
| Thirty fifth layer | $TiO_2$ | 26.90 |
| Thirty sixth layer | $MgF_2$ | 69.57 |
| Thirty seventh layer | $TiO_2$ | 36.05 |
| Thirty eighth layer | $MgF_2$ | 35.53 |
| Thirty ninth layer | $TiO_2$ | 43.30 |
| Fortieth layer | $MgF_2$ | 39.50 |
| Forty first layer | $TiO_2$ | 39.31 |
| Forty second layer | $MgF_2$ | 30.48 |
| Forty third layer | $TiO_2$ | 22.99 |
| Forty fourth layer | $MgF_2$ | 84.91 |

The high refractive index layer and the low refractive index layer can be other materials. The number of layers and the thickness of each layer can be designed according to actual requirement.

Figure 2:
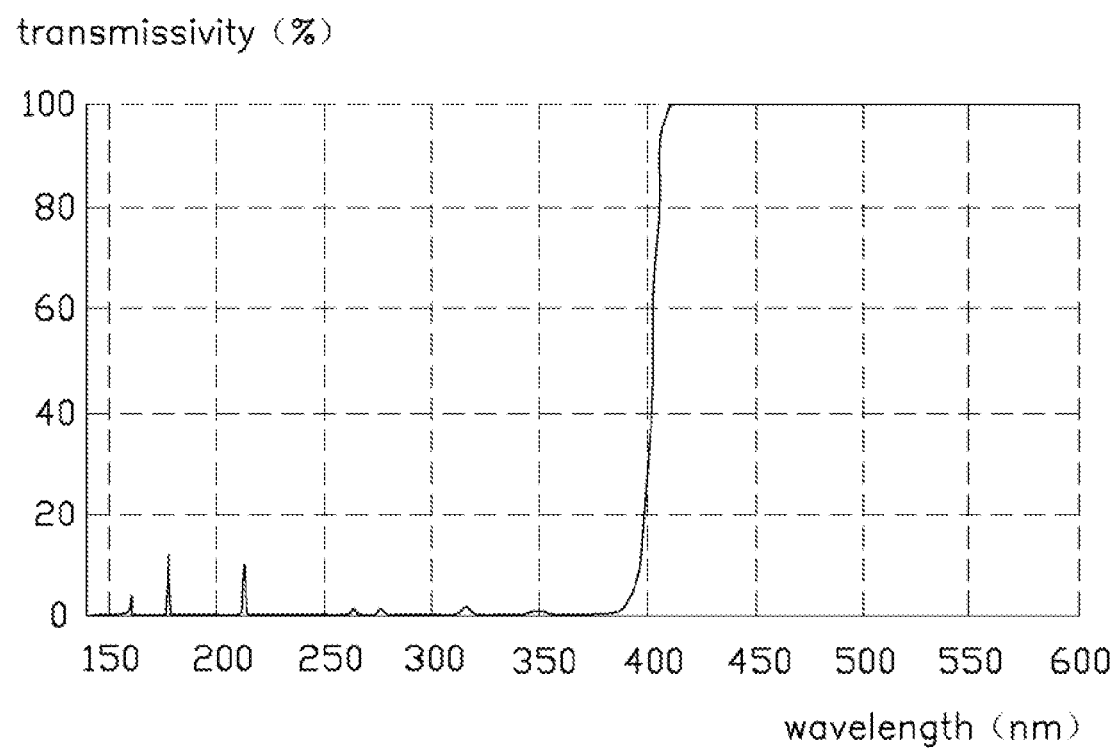
FIG. 2 is a graph showing a spectrum characteristic curve of the optical element of FIG. 1.

Referring to FIG. 2, a graph showing a spectrum of the optical element 100 is illustrated. The reflectivity of the optical element 100 at the ultraviolet wavelengths from about 190 nm to about 400 nm is about 100%. The transmissivity of the substrate 10 at the visible wavelengths greater than 400 nm is about 100%.

Figure 3:
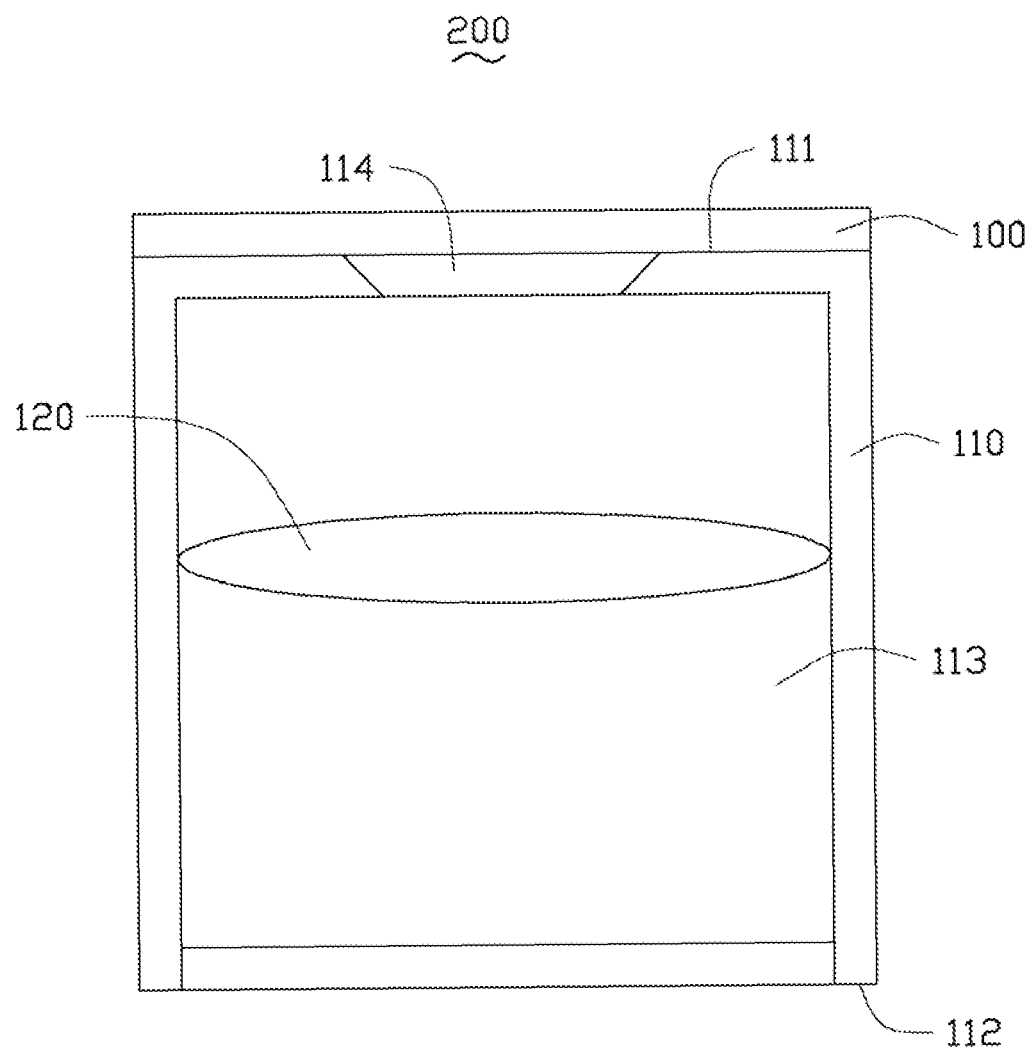
FIG. 3 is a cross-sectional schematic view of a lens module using the optical element of FIG. 1.

Referring to FIG. 3, a lens module 200, according to an exemplary embodiment, includes the optical element 100, a lens barrel 110, and at least one lens 120. The lens barrel 110 includes an object side 111 and an image side 112 opposite to the object side 111. A receiving room 113 is formed between the object side and the image side 112. The lens barrel 110 defines a light entering hole 114 communicating with the receiving room 113 and positioned on the object side 111. The at least one lens 120 is received in the receiving room 113. The object side 111 is covered by the optical element 100, and the light entering hole 114 is sealed by the optical element 100. The optical element 100 not only can filter ultraviolet light and transmit visible light, but also can protect the lens module 200 from being damaged by an external force.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical element, comprising:
   a substrate made of sapphire; and
   a film covered on the substrate and configured for increasing reflectivity of ultraviolet lights and filtering the ultraviolet lights; the film comprising a plurality of high refractive index layers and a plurality of low refractive index layers alternately stacked on the substrate, wherein the film is stacked by a first layer to a forty fourth layer in an order facing away from the substrate, the high refractive index layers are the odd number layers, the low refractive index layers are the even number layers, thicknesses of the first through forty fourth layers are about 14 nm, 38 nm, 17 nm, 16 nm, 20 nm, 41 nm, 21 nm, 37 nm, 17 nm, 39 nm, 25 nm, 45 nm, 19 nm, 35 nm, 19 nm, 34 nm, 10 nm, 20 nm, 19 nm, 31 nm, 15 nm, 32 nm, 35 nm, 42 nm, 28 nm, 43 nm, 15 nm, 28 nm, 35 nm, 44 nm, 27 nm, 74 nm, 29 nm, 57 nm, 26 nm, 69 nm, 36 nm, 35 nm, 43 nm, 39 nm, 39 nm, 30 nm, 22 nm, 84 nm, respectively, and the error of the thickness of each layer is ±3 nm.

2. The optical element of claim 1, wherein a material of the high refractive index layers is titanium dioxide ($TiO_2$), and a material of the low refractive index layers is magnesium fluoride ($MgF_2$).

3. A lens module, comprising:
   a lens barrel comprising an object side and an image side opposite to the object side, the lens barrel defining a receiving room between the object side and the image side, the lens barrel defining a light entering hole communicating with the receiving room and positioned on the object side;
   at least one lens received in the receiving room; and
   an optical element covering the light entering hole, the optical element comprising:
     a substrate made of sapphire; and
   a film covered on the substrate and configured for increasing reflectivity of ultraviolet lights and filtering the ultraviolet lights; the film comprising a plurality of high refractive index layers and a plurality of low refractive index layers alternately stacked on the substrate, wherein the film is stacked by a first layer to a forty fourth layer in an order facing away from the substrate, the high refractive index layers are the odd number layers, the low refractive index layers are the even number layers, thicknesses of the first through forty fourth layers are about 14 nm, 38 nm, 17 nm, 16 nm, 20 nm, 41 nm, 21 nm, 37 nm, 17 nm, 39 nm, 25 nm, 45 nm, 19 nm, 35 nm, 19 nm, 34 nm, 10 nm, 20 nm, 19 nm, 31 nm, 15 nm, 32 nm, 35 nm, 42 nm, 28 nm, 43 nm, 15 nm, 28 nm, 35 nm, 44 nm, 27 nm, 74 nm, 29 nm, 57 nm, 26 nm, 69 nm, 36 nm, 35 nm, 43 nm, 39 nm, 39 nm, 30 nm, 22 nm, 84 nm, respectively, and the error of the thickness of each layer is ±3 nm.

4. The lens module of claim 3, wherein a material of the high refractive index layers is titanium dioxide ($TiO_2$), and a material of the low refractive index layers is magnesium fluoride ($MgF_2$).

\* \* \* \* \*